Aug. 1, 1961 — W. A. SHIELDS — 2,994,172
APPARATUS FOR SEALING CLOSURE CAPS TO VIALS
Filed Sept. 8, 1959 — 6 Sheets-Sheet 1

INVENTOR
WALTER A. SHIELDS
BY John A. Seifert
ATTORNEY

Aug. 1, 1961 W. A. SHIELDS 2,994,172
APPARATUS FOR SEALING CLOSURE CAPS TO VIALS
Filed Sept. 8, 1959 6 Sheets-Sheet 3

INVENTOR
WALTER A. SHIELDS
BY John A. Seifert
ATTORNEY

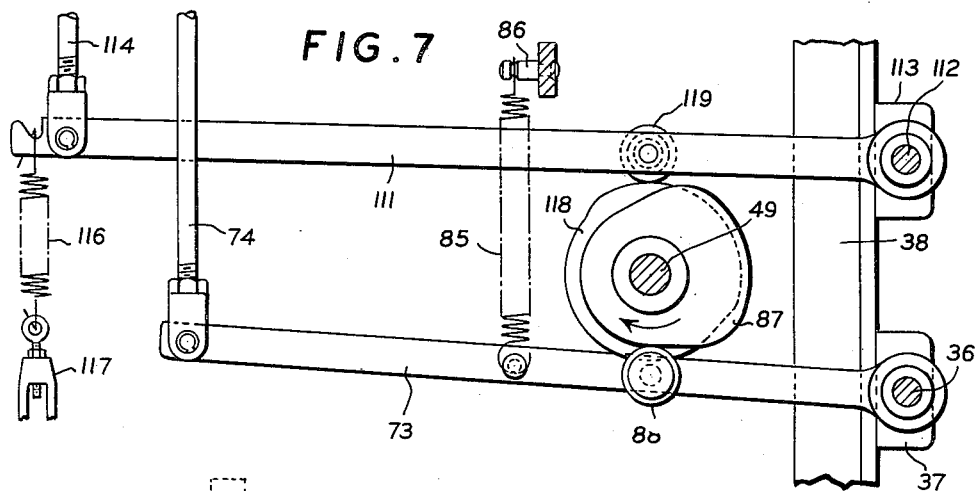
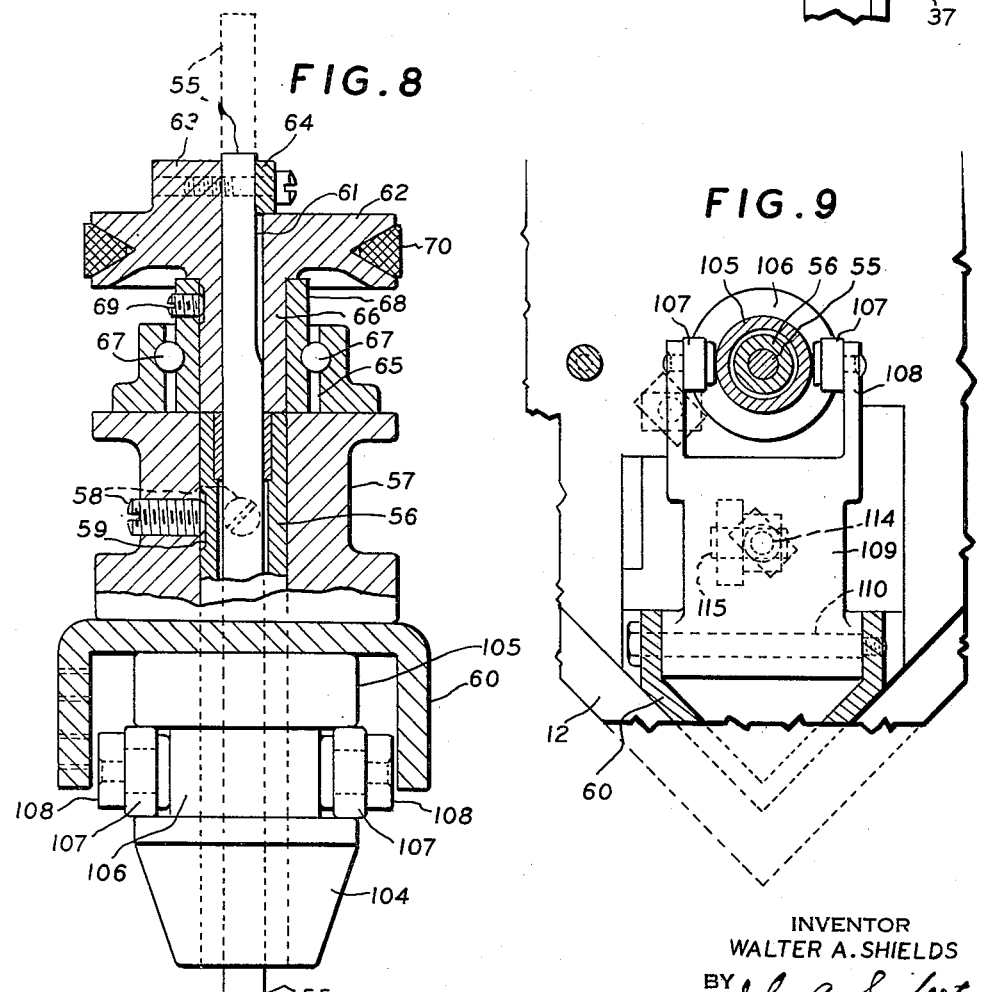

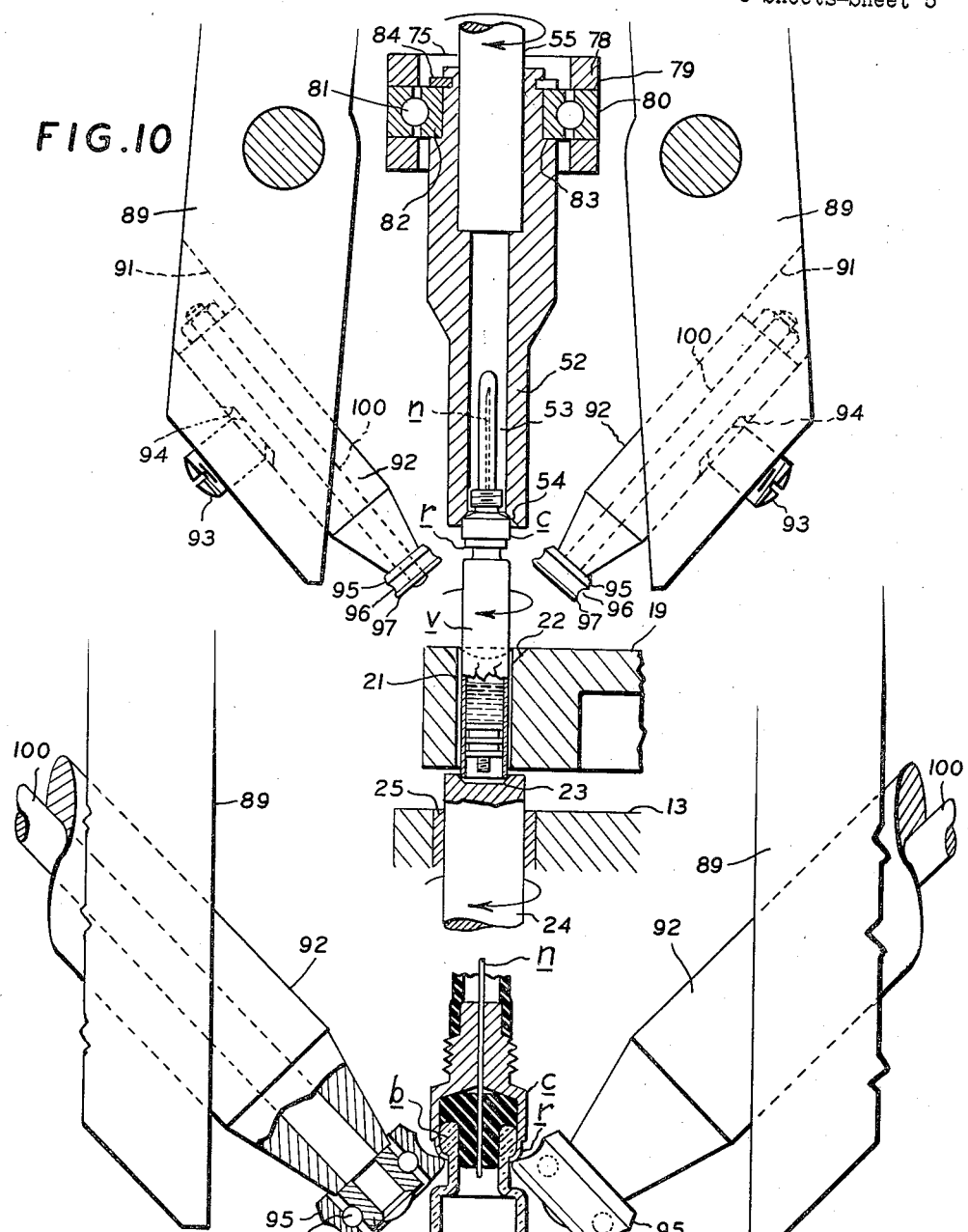

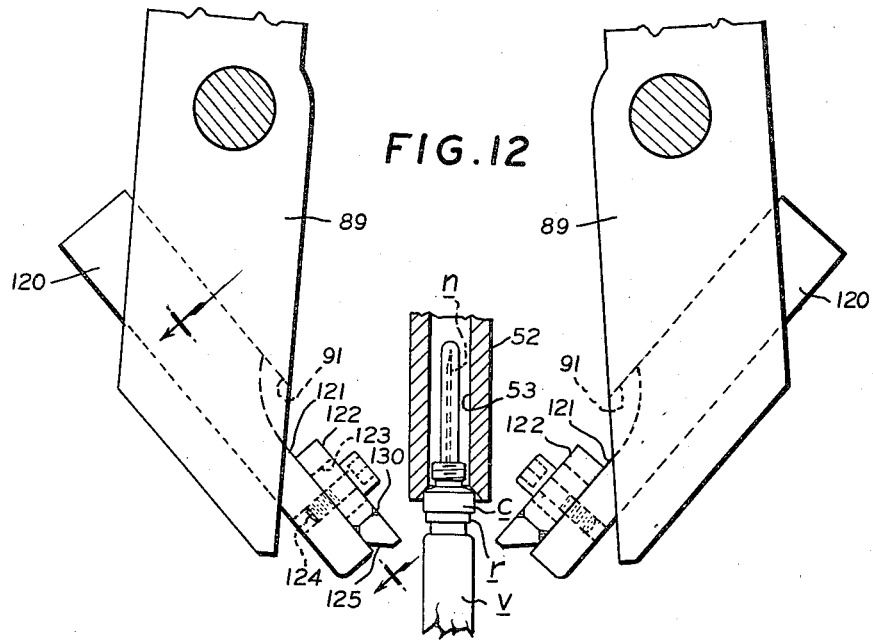
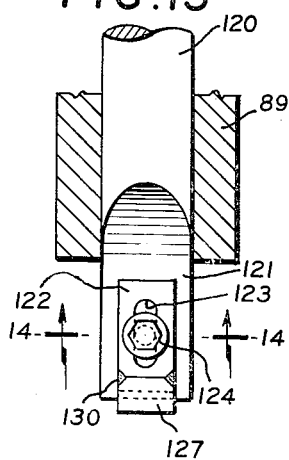
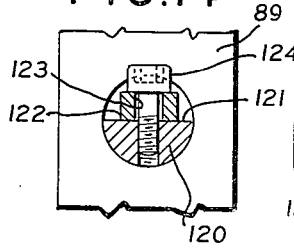
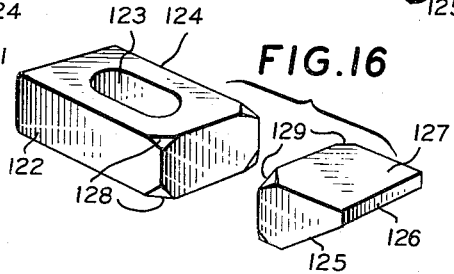
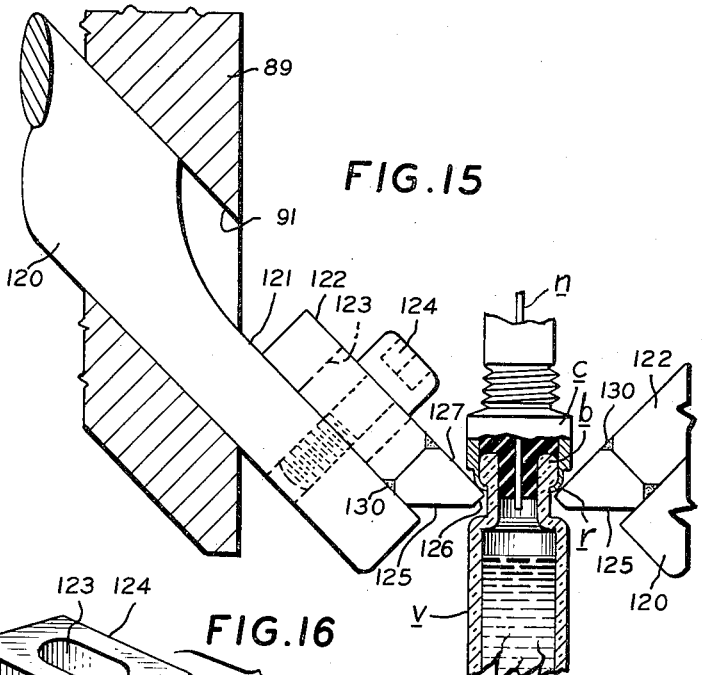
INVENTOR
WALTER A. SHIELDS
BY John A. Seifert
ATTORNEY

United States Patent Office 2,994,172
Patented Aug. 1, 1961

2,994,172
APPARATUS FOR SEALING CLOSURE CAPS TO VIALS
Walter A. Shields, 58—09 24th St., Jamaica, N.Y.
Filed Sept. 8, 1959, Ser. No. 838,582
20 Claims. (Cl. 53—329)

This invention relates to apparatus for filling vials with a liquid medicament, such as novocain and penicillin, positioning closure caps on the filled vials, sealing the closure caps to the filled vials, and selectively discharging vials having closure caps sealed thereon and vials without closure caps from the apparatus.

This invention particularly relates to means for sealing the closure caps to the filled vials.

It is an object of the invention to provide means to separately rotate the vials and closure caps positioned thereon while separately exerting a longitudinal force on the vial and the closure cap in a direction toward each other and subsequently engaging crimping members with the lower skirt portion of the closure cap.

It is another object of the invention to rotate the vial and the closure cap positioned thereon at the same rate of speed.

It is another object of the invention to simultaneously rotate and lift or exert an upward longitudinal force on the vial.

It is another object of the invention to simultaneously rotate and exert a downward longitudinal force on the closure cap.

It is a further object of the invention to provide crimping members movable in an arc toward and away from said skirt portion on opposite sides of the path of travel of the vials to permit the travel of shielded needles of the closure caps between the crimping members without interference.

A further object of the invention is to adjustably support a plurality of vials to accommodate vials of different lengths.

In the drawings accompanying and forming a part of this application:

FIGURE 7 is a side elevational view, on a reduced scale, taken on the line 7—7 of FIGURE 1 looking in the direction of the arrows to show actuating means for the closure cap crimping members and the closure cap pressure applying means;

FIGURE 8 is a sectional view, on an enlarged scale, taken on the line 8—8 of FIGURE 2 looking in the direction of the arrows to show a rotatable mounting of a pulley and a rotatable and sliding connection of said pulley with a shaft forming part of the means to rotate the closure cap;

FIGURE 9 is a sectional view taken on the line 9—9 of FIGURE 2 looking in the direction of the arrows to show a pivotal connection between parts of the actuating means for the closure cap crimping members;

FIGURE 10 is an enlarged elevational view of the crimping members actuated to non-crimping position with the closure cap rotating and pressure applying means in cross-section, the vial rotating and pressure applying means partly in section and the vial partly in section to show a medicament expelling plunger closing the bottom thereof;

FIGURE 11 is a view similar to FIGURE 10, on a larger scale, showing the crimping members in closure cap sealing position;

FIGURE 12 is a view similar to FIGURE 10 showing a modified form of crimping members;

FIGURE 13 is a view of the modified form of crimping member looking in the direction of the arrows in FIGURE 12;

FIGURE 14 is a sectional view, on an enlarged scale, taken on the line 14—14 of FIGURE 13 looking in the direction of the arrows;

FIGURE 15 is a view similar to FIGURE 11 showing the modified form of crimping members in sealing position; and FIGURE 16 is a perspective view of the modified form of crimping member showing the manner of forming said member.

Figure 1:
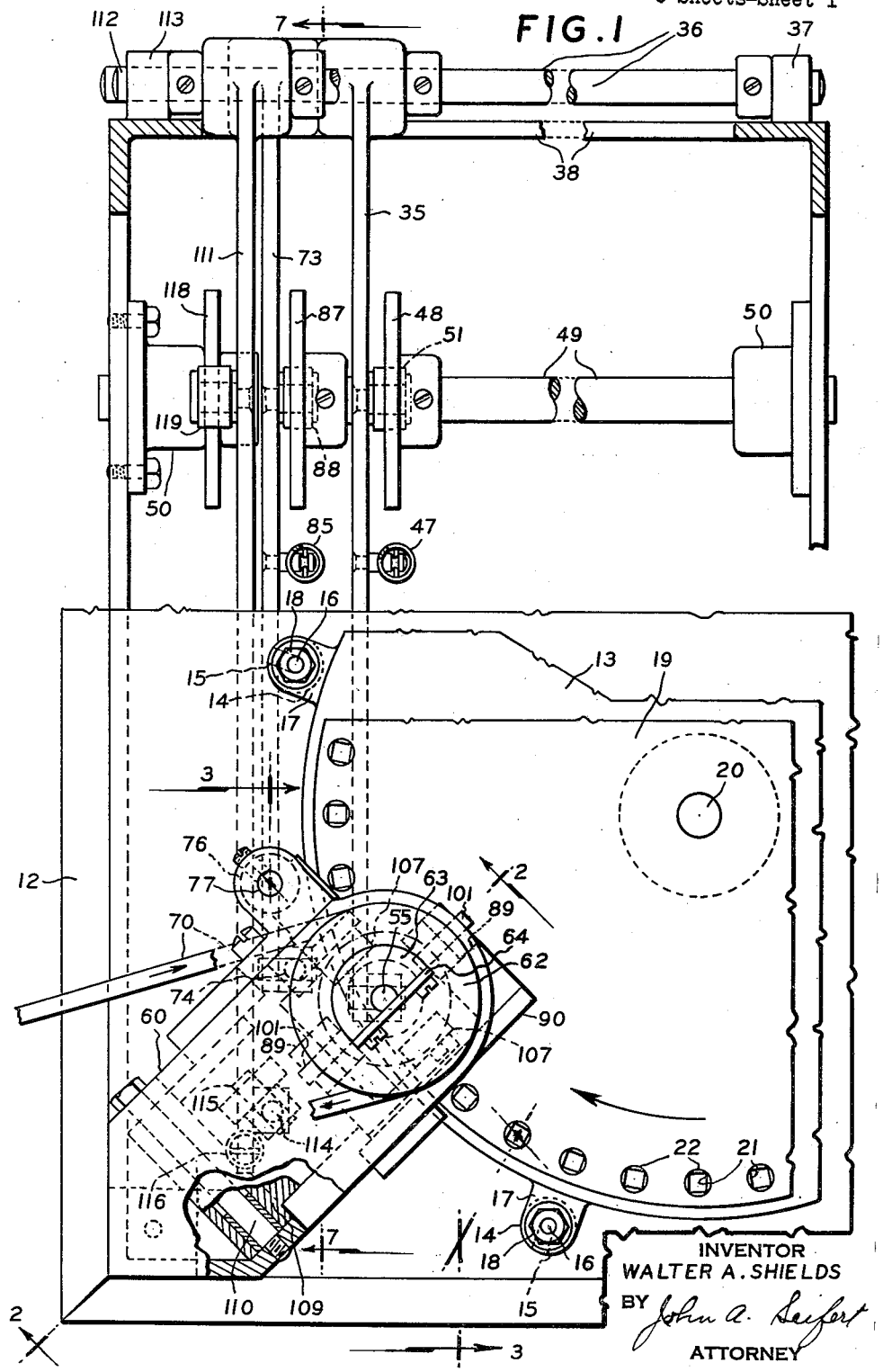
FIGURE 1 is a top plan view of a part of the apparatus forming the embodiment of the present invention.
Figure 2:
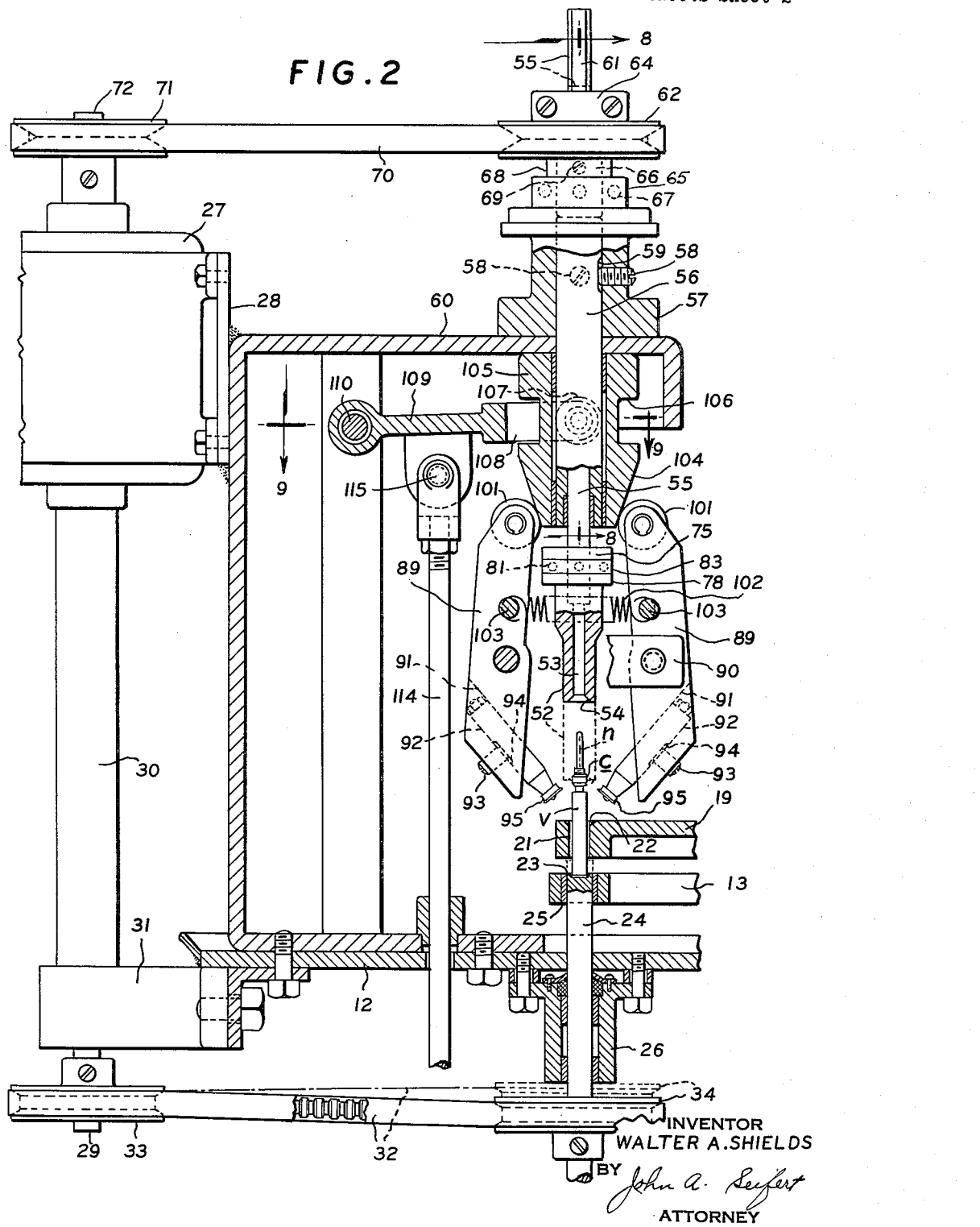
FIGURE 2 is a sectional view in elevation taken on the line 2—2 of FIGURE 1 looking in the direction of the arrows and showing in full lines the initial position of a vial and a closure cap positioned thereon and in dotted lines the operative position of the vial rotating and lifting means and the closure cap rotating and force or pressure applying means.
Figure 3:
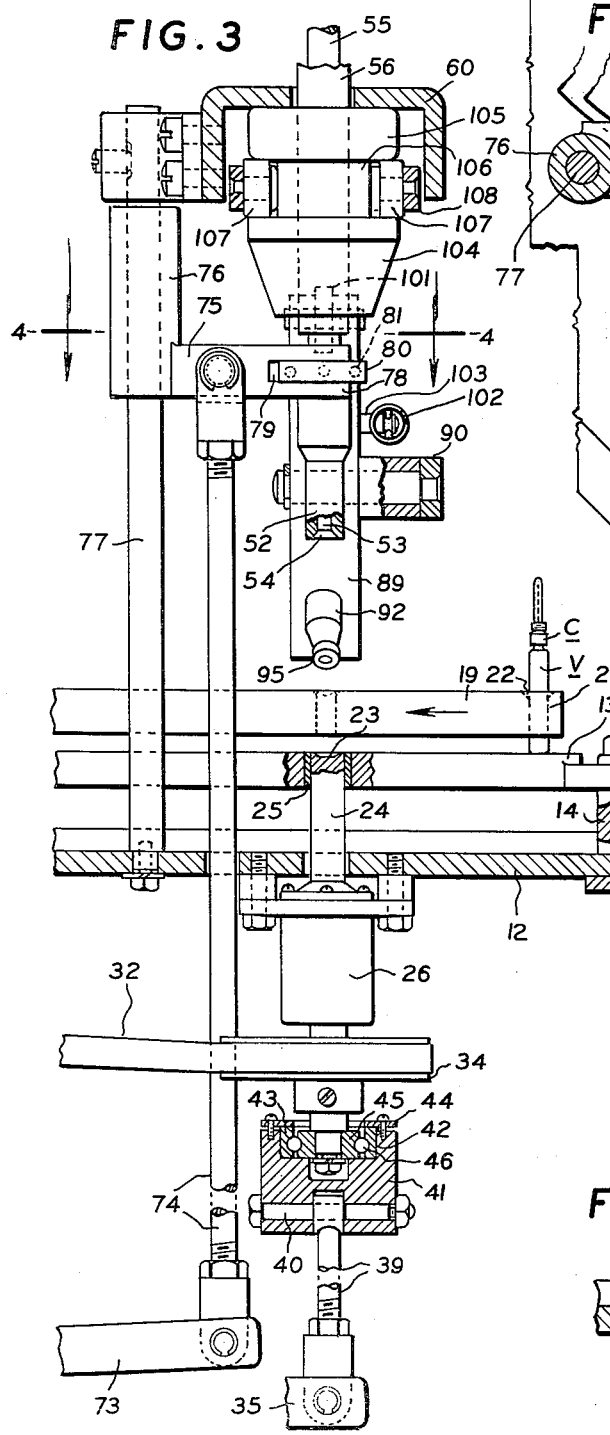
FIGURE 3 is an elevational view taken substantially on the line 3—3 of FIGURE 1 looking in the direction of the arrows to show actuating means for the pressure applying means for the closure caps and part of actuating means for the crimping members.
Figure 4:
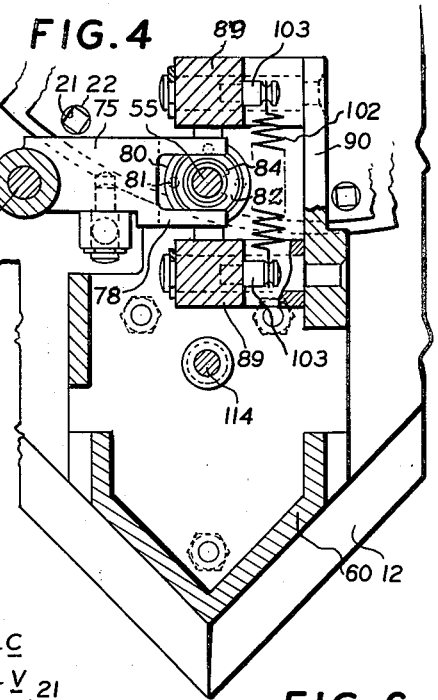
FIGURE 4 is a sectional view taken on the line 4—4 of FIGURE 3 looking in the direction of the arrows.
Figure 6:
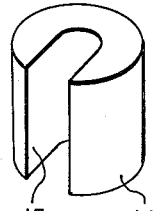
FIGURE 6 is a perspective view of a removable spacer forming part of the adjustable vial supporting means.

The embodiment of the invention is supported in elevated position by a table 12, as shown in FIGURES 1, 2 and 3.

Figure 5:
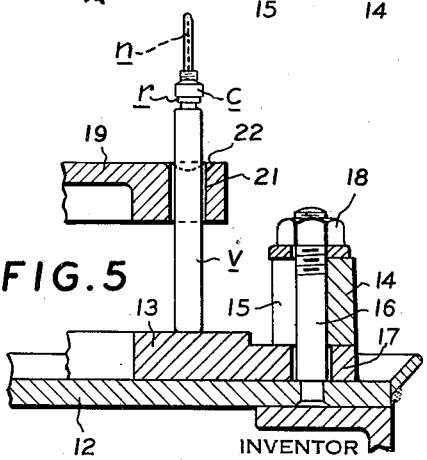
FIGURE 5 is a fragmentary sectional view of adjustable supporting means for the vials showing said means adjusted to support the longest vial.

A plurality of vials $v$ having closure caps $c$ loosely positioned thereon are supported in upright position by a circular platform 13 supported by the table 12 in either of two ways depending on the lengths of the vials being sealed. When the bodies of the vials are short or of minimum size as shown in all of the figures except FIGURE 5, the platform 13 is supported by spacers 14 having radially extending slots 15 to facilitate ready engagement of the spacers on studs 16 fixed in spaced peripheral portions of the table 12. The studs 16 extend from the spacers 14 into and through ears 17 projecting from spaced perpiheral portions of the platform 13. The ears 17 are clamped to the spacers by nuts 18 screw-threaded on the ends of the studs 16 projecting above the ears 17, as shown in FIGURES 1 and 3. When the vials are longer, as shown in FIGURE 5, the spacers 14 are removed by simply loosening the nuts 18 and slipping the spacers 14 from the studs 16 through the slots 15 after a wedge or wedges, not shown, have been placed between the table 12 and the platform 13 to relieve the weight of the platform 13 from the spacers 14. After removal of the spacers 14, the wedges are removed and the platform 13 is lowered to rest on the table 12. The platform 13 is clamped to the table 12 by replacing the spacers 14 on the studs 16 between the ears 17 and the nuts 18 and tightening the nuts against the spacers. The platform 13 may be positioned variable distances from the table 12 depending on the lengths of the vials $v$ by using spacers 14 of desired lengths.

The vials $v$ having the caps $c$ loosely placed thereon are transported in spaced relation to each other along the platform 13 by a circular member 19 mounted on a shaft 20 rotatably supported in the table 12, as shown in FIGURE 1. The transporting member 19 is intermittently rotated by suitable mechanism, not shown, supported by the table and operatively connected to the shaft 20. The transporting member 19 is provided with an annular series or row of square openings 21 slightly larger than the diameter of the vials *v* so that the vials *v* are able to be adjusted laterally of the vertical axes of the vials, as hereinafter described. The upper ends of the openings 21 are rounded, as shown at 22 in FIGURES 1, 2, 3, 5, 10, and 11, to facilitate the initial positioning of empty vials *v* into the openings 21. The thickness of the transporting member 19 is less than the length of any size vial handled by the apparatus and the member 19 is mounted on the shaft 20 so that the member 19 is spaced above the platform 13 and opposite end portions of the vials *v* extend from the opposite faces of the member 19, as shown in FIGURES 2, 3, 5 and 10.

By the intermittent rotation of the transporting member 19, the vials *v* and closure caps *c* are successively positioned on a recessed face 23 of a plunger 24 having the upper end portion slidably and rotatably supported in a bearing 25 in the platform 13. The lower end portion of the plunger 24 is slidably and rotatably supported in an elongated bearing 26 mounted on the under face of the table 12. The plunger 24 is continuously rotated by suitable power means, such as an electric motor 27, supported from the table 12 by a bracket 28, as shown in FIGURE 2, and a drive shaft 29 of the motor 27 protected by a tubular shield 30 supported from the table 12 by a bracket 31. The drive shaft 29 is operatively connected to the plunger 24 through a belt 32 passing around a pulley 33 secured to the drive shaft 29 and a pulley 34 secured to the plunger 24 below the bearing 26, as shown in FIGURES 2 and 3. The seating of the vial *v* in the recessed face 23 will assure the rotation of the vial by the plunger 24. The openings 21 being larger than the diameters of the vials will permit the centering of a vial in the recess 23 of the plunger 24. The plunger 24 is reciprocated by a lever 35 pivoted at one end on a shaft 36 mounted in bearings 37 fixed to a supporting frame 38 of the table 12, as shown in FIGURES 1 and 7. The opposite end of the lever 35 is pivotally connected to one end of a rod 39 (FIGURE 3) having the opposite end pivotally connected to a pin 40 transversely mounted in the lower portion of a non-rotating member 41 of a universal joint. The other member of the universal joint comprises a ball bearing race mounted in a recess 42 in the upper portion of the member 41 and comprising an annular member 43 secured in the recess 42 by an annular plate 44 secured to the member 41, an annular member 45 secured to the end of the plunger 24 below the pulley 34 and ball bearings 46 connecting the members 43, 45 and permitting the rotation of the plunger 24 by the motor 27 while the plunger 24 is reciprocated by the lever 35, as shown in FIGURE 3. The plunger 24 is yieldingly urged in an upward direction by a spring 47 anchored at one end to the table 12 and the opposite end connected to an intermediate portion of the lever 35, as shown in FIGURE 1. The upward movement of the plunger 24 is controlled by a cam disk 48 secured to a shaft 49 rotatably supported in bearings 50 mounted on the frame 38 and a cam follower 51 rotatably mounted on the lever 35 between the spring 47 and the shaft 36 to engage the cam disk 48 under the force of the spring 47. The shaft 49 is continuously rotated by suitable power means, not shown. The cam disk 48 is arranged whereby the recessed end of the plunger 24 is flush with the upper surface of the platform 13 during the rotation of the transporting member 19 and during the rest period of said transporting member the low portion of the cam disk 48 will engage the cam follower 51 and permit the spring 47 to move the recessed end of the plunger 24 above the upper surface of the platform 13 and lift the vial *v* and associated closure cap *c*, as shown in FIGURE 10. During the lifting of the vial and closure cap, the pulley 34 will move to the dotted line position shown in FIGURE 2. To assure the transmission of the rotation of the pulley 33 to the pulley 34 in all of the positions of the pulley 34, the belt 32 is of the Gilmer type as shown in FIGURE 2.

Simultaneously with the rotation and lifting of the vial *v*, the associated closure cap *c* is rotated by a head 52 having a central cavity 53 to receive a shielded needle *n* projecting from the closed end of the closure cap and arranged with a bevelled face 54 to abut the closed end of the closure cap, as shown in FIGURES 2, 3 and 10. The head 52 is fixed to a shaft 55 slidably and rotatably mounted in a sleeve bearing 56 secured in a boss 57 by set-screws 58 abutting recesses 59 of greater length than the diameters of the set-screws, as shown in FIGURES 2 and 8, to permit longitudinal adjustment of the bearing 56. The boss 57 is mounted on a housing 60 secured to the table 12, as shown in FIGURES 1, 2, 3, 4, 8 and 9. The upper end portion of the shaft 55 is extended above the sleeve bearing 56 and the boss 57 and is arranged with a longitudinal flat face 61. A pulley 62 is mounted on said projecting end portion of the shaft 55 to slide on said end portion and impart rotation to said shaft. This is accomplished by providing the pulley 62 with an upper hub portion of semi-circular shape, as shown at 63 in FIGURES 1 and 8, and a plate 64 secured at the ends to said hub portion 63 with the center portion of the plate slidingly engaging the flat face 61 of the shaft 55, as shown in FIGURES 1, 2 and 8. The pulley 62 is rotatably supported by the boss 57 by a collar 65 secured to the upper end of said boss, as shown in FIGURE 8, and an elongated lower hub portion 66 of the pulley 62 extending into the collar 65. To facilitate rotation of the hub portion 66 in the collar 65, there is provided a ball-bearing race comprising ball-bearings 67 seated on the side wall of the collar 65 and a sleeve 68 secured to the hub portion 66 by a set-screw 69, as shown in FIGURES 2 and 8. The pulley 62 is rotated by the motor 27 through a belt 70 extending around the pulley 62 and a pulley 71 fixed to a drive shaft 72 of the motor 27.

The head 52 is reciprocated toward and away from the closure cap *c* by a lever 73 pivotally mounted at one end on the shaft 36 adjacent to the lever 35. The opposite end of the lever 73 is pivotally connected to one end of a rod 74 extended through the table 12 and having the opposite end pivotally connected to an arm 75 extending laterally from a sleeve 76 slidable on a standard 77 secured at the opposite ends to the table 12 and to the housing 60, as shown in FIGURE 3. The free end of the arm 75 is forked to extend on opposite sides of the head 52, as shown at 78 in FIGURES 4 and 10, and the prongs of the fork are slotted longitudinally, as at 79 in FIGURE 3, to engage a fixed member 80 of a ball-bearing race comprising ball-bearings 81 and a rotating member 82 secured to the head 52 between a shoulder 83 on the head 52 and a spring washer engaged in an annular slot in the head, as shown at 84 in FIGURES 4 and 10, whereby the head 52 is rotated by the motor 27 while it is reciprocated by the lever 73. The head 52 is yieldingly urged to a position in spaced relation to the shielded needle *n* by a spring 85 anchored at one end to a fixed part of the table 12, as shown at 86 in FIGURE 7, and the opposite end connected to an intermediate portion of the lever 73. The movement of the head 52 away from the shielded needle *n* by the spring 85 is controlled by a cam disk 87 fixed on the shaft 49 and a cam follower 88 rotatable on the lever 73 between the spring 85 and the shaft 36, as shown in FIGURE 7. The cam disk 87 is arranged to move the head 52 against the force of the spring 85 to forcibly engage the bevelled face 54 of the head 52 with the closure cap *c* and the shielded needle *n* extending into the cavity 53 of the head 52.

When the vial *v* and the closure cap *c* are in the position shown in FIGURE 10, a wall portion *r* of reduced thickness of the skirt at the open end of the closure cap *c* is crimped under a mouth bead *b* of the vial while the vial $v$ and the closure cap $c$ are rotated by the plunger 24 and the head 52, respectively, in the same direction indicated by the arrows in FIGURE 10. This is accomplished by sealing means comprising a pair of levers 89 pivotally mounted intermediate their ends on opposite sides of the path of travel of the vials on a bracket 90 supported by the housing 60, as shown in FIGURES 1, 2, 3 and 4. The lower end of each lever 89 is provided with a transverse opening 91 extending obliquely to the longitudinal axis of the lever for the mounting of a tool holder. In FIGURES 2, 3, 10 and 11, the tool holder is shown as tubular, as at 92, adjustably secured in the opening 91 by a set-screw 93 engaging an elongated recess 94 in the holder 92. The holder 92 supports a crimping tool comprising a roller 95 having an annular groove 96 in the periphery of arcuate shape in cross-section, as shown in FIGURES 10 and 11, to form an annular bead 97 at the outer end of the roller. The roller 95 is rotatably supported by ball-bearings 98 on an annular member 99 fixed to a projecting end portion of a shaft 100 secured in the tool holder 92. The opposite end of each lever 89 is provided with a cam roller 101 yieldingly urged toward the shaft 55 by a spring 102 connected at the opposite ends to pins 103 projecting from the levers 89 above the bracket 90. The spring 102 will position the rollers 95 from the reduced skirt portion $r$ of the closure cap $c$ and urge the rollers 101 against a downwardly tapering cam face 104 of a sleeve member 105 slidable on the sleeve bearing 56 within the housing 60. Said sleeve member 105 is arranged with an annular groove 106 for the engagement of rollers 107 rotatably mounted on the leg sections of a bifurcated portion 108 of an arm 109 pivotally supported by the housing 60, as shown at 110. The arm 109 is oscillated by a lever 111 pivotally mounted at one end on a shaft 112 supported in bearings 113 fixed to the supporting frame 38, as shown in FIGURES 1 and 7. The opposite end of lever 111 is pivotally connected to one end of a rod 114 pivotally connected at the opposite end to the arm 109, as shown at 115 in FIGURES 1, 2 and 9. The cam sleeve 105 is yieldingly urged downwardly toward the rollers 101 to move the rollers 95 in an arcuate path into crimping engagement with the reduced skirt portion $r$ of the closure cap $c$ by a spring 116 anchored at one end to a turn-buckle 117 attached to a fixed part of the apparatus and the opposite end of the spring 116 is connected to the end of the lever 111 extending beyond the pivotal connection of the rod 114, as shown in FIGURES 1 and 7. The downward movement of the cam sleeve 105 is controlled by a cam disk 118 fixed on the shaft 49 and a cam follower 119 rotatable on the lever 111. The cam disc 118 is arranged so that the spring 116 will move the rollers 95 into crimping engagement with the reduced skirt portion $r$ of the closure cap $c$ while the vial $v$ and the closure cap $c$ are rotated by the plunger 24 and the head 52, respectively. After the crimping or sealing has been completed, the high portion of the cam disk 118 will actuate the lever 111 to move the rod 114 in an upward direction against the force of the spring 116 and position the smallest diameter portion of the cam face 104 into engagement with the rollers 101 thereby permitting the spring 102 to move the rollers 95 out of engagement with the reduced skirt portion $r$ of the closure cap $c$. Due to the pivotal mounting of the levers 89 and the oblique mounting of the tool holders 92 in said levers 89, the rollers 95 will travel in an upward arcuate direction to engage the beads 97 of the rollers 95 with the reduced skirt portion $r$ of the closure cap $c$ and crimp said reduced skirt portion $r$ around the mouth bead $b$ of the vial $v$ in the manner shown in FIGURE 11.

In FIGURES 12 to 16, inclusive, there is shown a modified form of tool holder and tool for crimping or rolling the reduced skirt portion $r$ of the closure cap $c$ around the mouth bead $b$ of the vial $v$. This modified holder comprises a rod 120 secured in each of the transverse openings 91 of the levers 89 in a suitable manner, such as sweating, with one end portion of the rods projecting from the inner or opposing sides of the levers 89. The projecting end portions of the rods 120 are arranged with a flat face 121 for the adjustable mounting of a flat crimping tool comprising a block 122 of ordinary tool steel having a slot 123 therethrough for the engagement of a bolt 124 threaded in the projecting end portions of the rods 120 and provided with an Allen head to abut the upper face of the block 122 and secure the blocks to the holders 120 in adjusted position. The crimping part of the tools comprise a tip or nose piece of hardened tool steel, such as carboloy, having a bevelled underface 125 and a narrow flat end face 126 extending perpendicularly to a flat upper face 127. The corners of the front end of the block 122 are bevelled, as at 128, and the corners of the rear end of the tip are correspondingly bevelled at 129 as shown in FIGURE 16, for brazing the block and tip to each other, as shown at 130. The crimping tools 122—130 are actuated in the same manner as the crimping tools 95—99 whereby they are moved in an arcuate direction toward and away from the reduced skirt portion $r$ of the closure cap $c$, as shown in FIGURES 12 and 15, and the movement of the tools toward the reduced skirt portion $r$ engaging the portions of the flat upper faces 127 adjacent the flat end faces 126 with the reduced skirt portion $r$ and rolling said reduced skirt portion $r$ around the mouth bead $b$ by the rotation of the vial $v$ and the closure cap $c$. The mounting of the tools in oblique planes on opposite sides of the path of travel of the vials will also permit the shielded needles $n$ to travel between the tools without interference.

Having thus described my invention, I claim:

1. In apparatus for sealing closure caps to vials, means to support a plurality of vials having closure caps thereon in upright position, means to successively transport said vials in spaced relation to each other along the supporting means, means to lift a vial from the supporting means and rotate the vial, means to rotate the closure cap on the lifted and rotating vial, and means adjustable into and out of engagement with the rotating closure cap to seal said rotating closure cap to the lifted and rotating vial, the vial transporting means being actuated to move the vial having a closure cap sealed thereon from the vial lifting and rotating means onto the vial supporting means.

2. Apparatus for sealing closure caps to vials as claimed in claim 1, wherein the means to rotate the vial and the means to rotate the closure cap are respectively located below and above the vial transporting means and are actuated at the same rate of speed.

3. Apparatus for sealing closure caps to vials as claimed in claim 1, wherein the means to rotate the closure cap is reciprocated toward and away from the closure cap in the vertical plane of the closure cap and vial.

4. Apparatus for sealing closure caps to vials as claimed in claim 1, wherein the means to lift and rotate the vial comprises a plunger rotatably and slidably supported below the vial supporting means and in the vial supporting means, means to reciprocate the plunger from a position flush with the vial supporting means to a position above said vial supporting means, and means to simultaneously rotate the plunger.

5. Apparatus for sealing closure caps to vials as claimed in claim 1, wherein the means to rotate the closure cap on the lifted and rotating vial comprises a head rotatably and slidably supported above the transporting means and having a cavity therein conforming to the exterior shape of the closure cap, means to reciprocate the head into and out of engagement with the closure cap, and means to simultaneously rotate the head.

6. Apparatus for sealing closure caps to vials as claimed in claim 1, wherein the means to lift and rotate a vial comprises a plunger slidably and rotatably supported below and in the vial supporting means, and the means to rotate the closure cap on the vial comprises a head slidably and rotatably supported above the transporting means and in vertical alignment with the plunger, separate means for reciprocating the plunger and head, and a single means for simultaneously rotating the plunger and head.

7. Apparatus for sealing closure caps to vials as claimed in in claim 1, wherein the closure cap sealing means comprises a pair of levers pivoted intermediate the ends thereof on horizontal axes spaced on opposite sides of the vertical axes of the closure cap and vial, a tool supported on an end of each lever to engage the lower portion of the closure cap skirt, the opposite ends of the levers being yieldingly urged toward each other thereby positioning the tool out of engagement with the closure cap, and a reciprocating cam member to engage said opposite ends of the levers and move the tools into engagement with the closure cap skirt while the vial and closure cap are rotating.

8. Apparatus for sealing closure caps to vials as claimed in claim 1, wherein the vial supporting means comprises a platform, and the vial transporting means comprises a rotary member of a thickness less than the lengths of the vials having an annular series of spaced openings therein for the vials and rotating in a horizontal plane spaced above the platform and the platform adjustably supported to have adjustment toward and away from the rotary member to accommodate vials of different lengths, whereby opposite end portions of the vials project from the opposite faces of the rotary member.

9. Apparatus for sealing closure caps to vials as claimed in claim 1, wherein each vial is arranged with a mouth bead, each closure cap consists of a cup member having a skirt portion of reduced thickness at the open end of the cup member and adjacent to the mouth bead, and the sealing means comprises tools mounted to extend obliquely to the vertical axes of the vial and closure cap and movable in an arc toward and away from the reduced skirt portion of the cup member, whereby the tools when moved toward the reduced skirt portion while the vial and closure cap are rotating will crimp the reduced skirt portion under the mouth bead.

10. Apparatus for sealing closure caps to vials as claimed in claim 4, wherein the means to reciprocate the plunger comprises a lever pivoted at one end and connected at the opposite end to the plunger, said opposite end being yieldingly urged in an upward direction to normally position the plunger above the vial supporting means, and a rotating cam disk engaging the lever to control the upward movement of the plunger and actuate the plunger in a downward direction to a position flush with the vial supporting means.

11. Apparatus for sealing closure caps to vials as claimed in claim 10, wherein the means to simultaneously rotate the plunger comprises power means operatively connected to a portion of the plunger below the vial supporting means.

12. Apparatus for sealing closure caps to vials as claimed in claim 11, wherein a portion of the plunger below the operative connection between the power means and the plunger is provided with a universal joint comprising a non-rotating member pivotally connected to the opposite end of the lever and a rotating member rotatably mounted in the non-rotating member and secured to the plunger.

13. In apparatus for sealing closure caps to vials as claimed in claim 5, a rotatably and slidably mounted shaft on one end of which the head is mounted, the means to reciprocate the head comprises a lever pivoted at one end and the opposite end pivotally connected to the shaft and yieldingly urged in an upward direction to normally position the head in spaced relation above the closure cap on the vial, and a rotating cam disk engaging the lever to control the yielding upward movement of the head and actuate the head into engagement with the closure cap.

14. In apparatus for sealing closure caps to vials as claimed in claim 13, wherein the means to rotate the head comprises a pulley rotatably supported and mounted relative to the end portion of the shaft opposite the end on which the head is mounted and connected to said end of the shaft to have sliding movement on the shaft while imparting rotation thereto, and power means operatively connected to the pulley.

15. Apparatus for sealing closure caps to vials as claimed in claim 7, wherein each closure cap is provided with a shielded needle, and the horizontal axes of the pair of levers are spaced on opposite sides of the path of travel of the closure caps and vials to prevent interference with the free travel of the closure caps and vials when the tools are positioned out of engagement with the closure cap.

16. In apparatus for sealing closure caps to vials as claimed in claim 7, means to reciprocate the cam member comprising a lever pivoted at one end and the opposite end pivotally connected to the cam member and yieldingly urged in a downward direction to normally move the cam member into engagement with the opposite ends of the pair of levers and actuating the tools into crimping engagement with the lower portion of the closure cap skirt, and a rotating cam disk engaging the lever to control the yielding downward movement of the opposite end of the lever and actuate the cam member in a direction away from the opposite ends of the pair of levers to permit positioning of the tools out of engagement with the lower portion of the closure cap skirt.

17. In apparatus for sealing closure caps to vials as claimed in claim 7, wherein the tools comprise a holder adjustably mounted in an end of each lever of the pair of levers to extend obliquely to the longitudinal axes of the levers and a roller rotatably supported on an end of each holder with the axis of rotation coincidental with the longitudinal axis of the holder.

18. Apparatus for sealing closure caps to vials as claimed in claim 17, wherein the peripheral face of each roller is arranged with an annular bead for crimping the lower portion of the closure cap skirt.

19. Apparatus for sealing closure caps in vials as claimed in claim 7, wherein the tools comprise a holder mounted in an end of each lever of the pair of levers to extend obliquely to the longitudinal axis of the lever and a flat piece adjustably supported on the end of each holder to engage the lower portion of the closure cap skirt.

20. Apparatus for sealing closure caps to vials as claimed in claim 19, wherein the flat piece comprises a block of steel adjustably supported on each holder and a tip of hardened tool steel secured to each block.

References Cited in the file of this patent

UNITED STATES PATENTS

| | | |
|---|---|---|
| 954,200 | Mueller | Apr. 5, 1910 |
| 1,227,244 | Buhles | May 22, 1917 |
| 1,251,166 | Arnstein | Dec. 25, 1917 |
| 1,560,059 | Johnson | Nov. 3, 1925 |
| 2,732,114 | Annen | Jan. 24, 1956 |
| 2,902,809 | Wysocki | Sept. 8, 1959 |